United States Patent
Papageorgiou

(10) Patent No.: US 7,735,483 B2
(45) Date of Patent: Jun. 15, 2010

(54) FLOATING SOLAR CHIMNEY

(76) Inventor: Christos Papageorgiou, 1b Nymfon Str., GR-14563 Kifissia, Athens (GR)

( * ) Notice: Subject to any disclaimer, the term of this patent is extended or adjusted under 35 U.S.C. 154(b) by 1197 days.

(21) Appl. No.: 10/550,253

(22) PCT Filed: Sep. 8, 2003

(86) PCT No.: PCT/GR03/00037

§ 371 (c)(1),
(2), (4) Date: Dec. 1, 2005

(87) PCT Pub. No.: WO2004/085846

PCT Pub. Date: Oct. 7, 2004

(65) Prior Publication Data

US 2006/0272240 A1 Dec. 7, 2006

(30) Foreign Application Priority Data

Mar. 27, 2003 (GR) .............................. 20030100150

(51) Int. Cl.
*F24J 2/46* (2006.01)

(52) U.S. Cl. .................. 126/571; 126/570; 126/624; 126/625; 126/626; 52/218; 52/2.21; 60/641.8; 60/641.11; 60/641.12

(58) Field of Classification Search .................. 126/571, 126/570, 624, 625, 626; 52/218, 2.21, 2.17, 52/2.26; 454/1, 46, 47; 60/641.12, 641.11, 60/641.8, 398
See application file for complete search history.

(56) References Cited

U.S. PATENT DOCUMENTS 3,918,518 A * 11/1975 James ..................... 165/122

4,267,824 A * 5/1981 O'Halloran ................ 126/601
5,527,216 A * 6/1996 Senanayake ................. 454/1

FOREIGN PATENT DOCUMENTS

| DE | 30 06 702 | | 9/1981 |
| DE | 296 22 549 | | 3/1997 |
| WO | WO 96/04443 | * | 2/1996 |
| WO | WO 2004036039 A1 | * | 4/2004 |

(Continued)

OTHER PUBLICATIONS

Lodhi M A K: "Application of helio-aero-gravity concept in producing energy and suppressing pollution," *Energy Conversion and Management*, Elsevier Science Publishers, Oxford, GB, vol. 40, No. 4, Mar. 1, 1999, pp. 407-421.

* cited by examiner

*Primary Examiner*—Steven B McAllister
*Assistant Examiner*—Avinash Savani
(74) *Attorney, Agent, or Firm*—Kenyon & Kenyon LLP

(57) ABSTRACT

A floating solar chimney includes several parts, e.g., the Main Chimney, the Heavy Base, and the Folding Lower Part. The main chimney includes cylindrical balloon rings full of non flammable light gas. The cylindrical balloon rings are tied with the help of supporting rings so that together they form one or more compact units of the main chimney. The compact parts of the main chimney are fastened on the heavy base. The successive compact parts are separated by separating rings filled with environmental air that can go in and out of the separating rings, so that the dynamic independence of the successive compact parts is ensured. The main chimney, which can float, is configured to sit on a chimney seat, and is connected to the heavy base. The lower part of the heavy base is fastened to the folding lower part. The air can enter and come out freely from the rings of folding lower part in order to enable the floating solar chimney to achieve any suitable decline as dictated by the exterior winds.

7 Claims, 4 Drawing Sheets

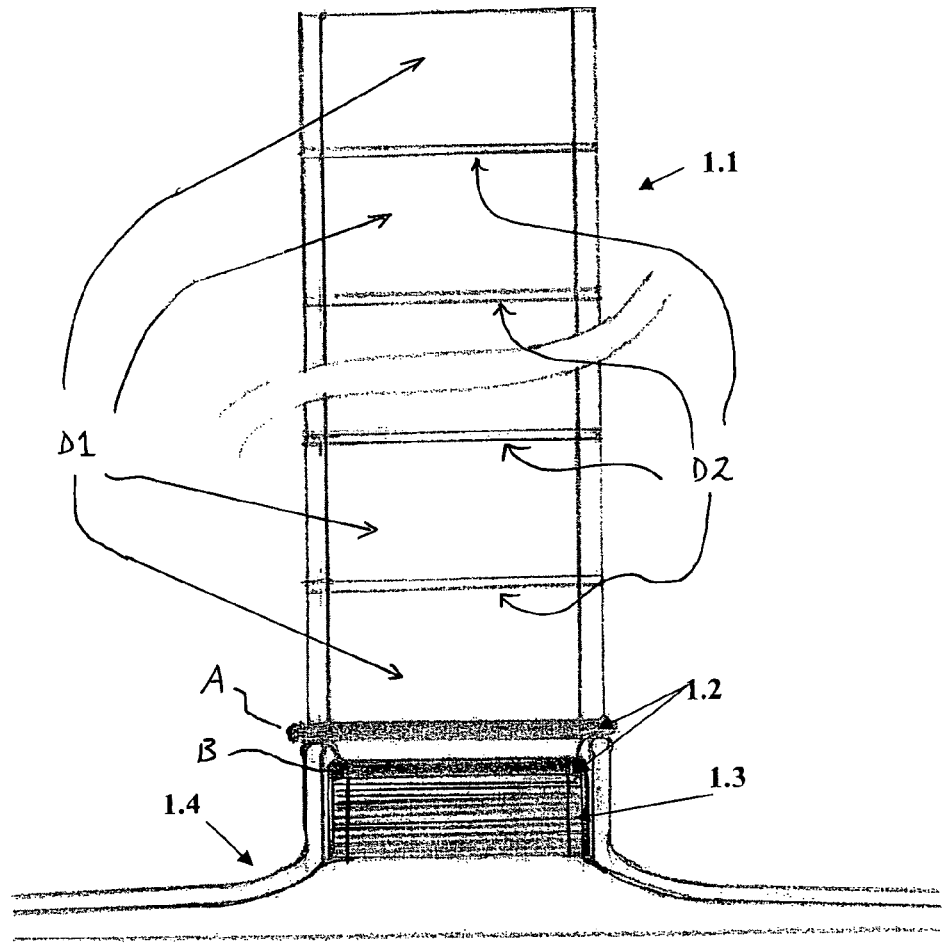
FIGURE 1 (α)

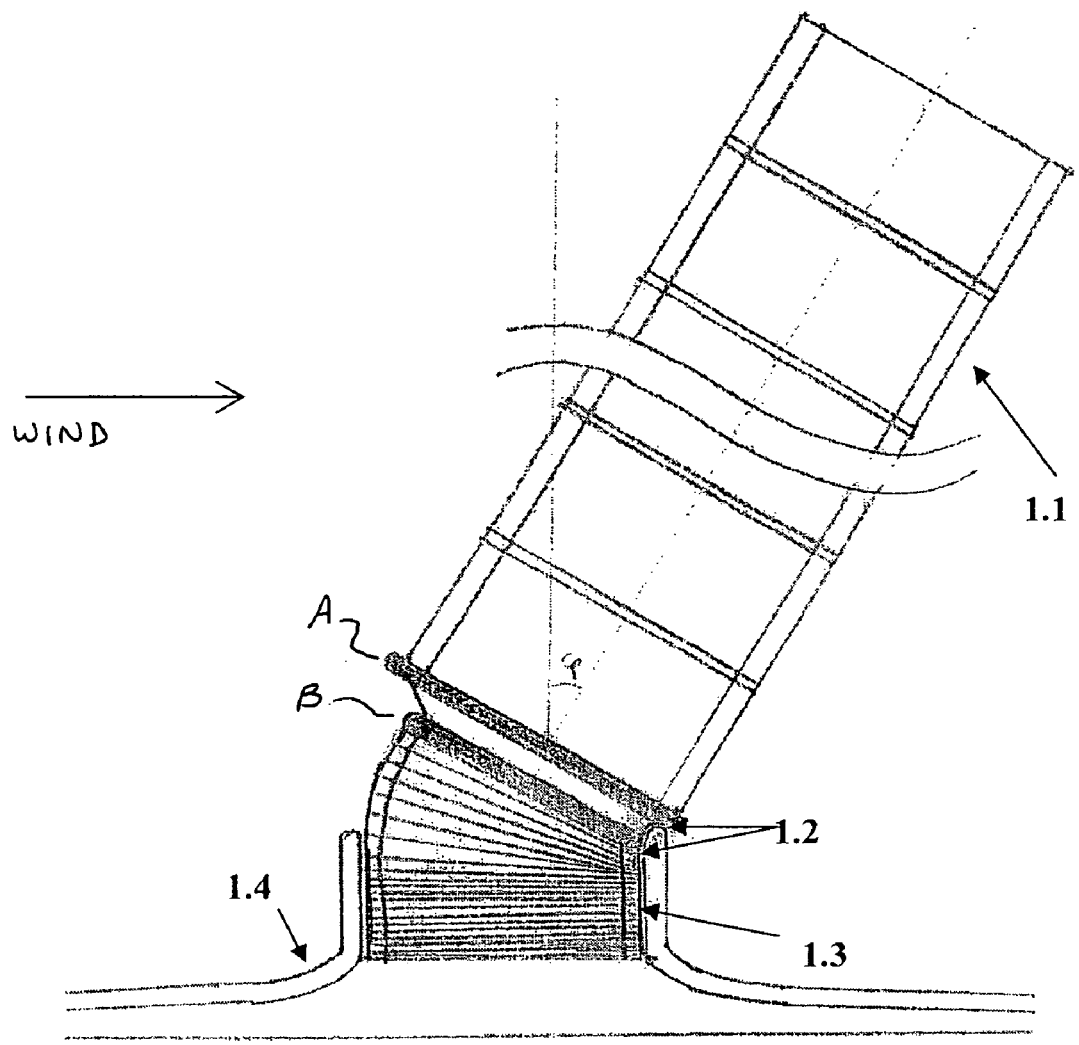
FIGURE 1 (β)

FLOATING SOLAR CHIMNEY

FIELD OF THE INVENTION

The present invention relates to solar chimney that can collaborate with solar collectors and wind turbo generators and form electric power stations working by solar power.

BACKGROUND INFORMATION

Such conventional electric power systems using solar energy, with the method of solar collectors and solar chimneys, are based on the principle of solar heating of air in a solar collector of a large area. The warm air rises, through a collaborating solar chimney that is based on the center of the collector, to upper layers of atmosphere, acquiring up-draft speed, due to the height of the solar chimneys. Part of the thermo mechanical energy of this up-drafting current of warm air, via a system of the wind turbines and generators in the base of the solar chimney, transforms into electric energy. The solar chimney in this conventional system is typically manufactured by reinforced concrete. This has the following consequences:

High manufacturing cost; and
Limited height of the solar chimneys due to technological restrictions from the construction materials and from exterior limitations (e.g., earthquakes).

It is known that the output of such a power station is approximately proportional to the product of the height of solar chimney and the area of the collaborating solar collector. Thus, for a given power output from such a solar power station, the height of the solar chimney determines the area of its collaborating solar collector.

Information about solar chimneys can be found in the book "THE SOLAR CHIMNEY ELECTRICITY FROM THE SUN", by JORG SCHLAICH, 1995.

SUMMARY

The present invention eliminates the above-mentioned disadvantages by increasing, for a given power output, the height of the solar chimney, and decreasing their construction cost as well as the area of the solar collectors, and thereby decreasing the total cost of the overall power system for generating electricity.

This is achieved by constructing the solar chimney with a double wall formed from durable elastic for balloons or airships, filled with gas He (or other non-flammable light gas) that makes the chimneys lighter than air. The lighter-than-air floating solar chimney can have much bigger height than the conventional solar chimney formed from reinforced concrete, while simultaneously its costs remain considerably lower than the cost of a conventional chimney from reinforced concrete.

The construction of a floating, lighter-than-air chimney is implemented taking into consideration that the solar chimney is used exclusively for the up-drafting of warm air. Thus solar chimney stresses arise from the exterior winds and the Bernoulli pressure from the internal stream of warm air. An advantageous, simple and inexpensive construction can face these stresses effectively. The modern plastic and composite materials that are used for airships or balloons can be used for such a construction, combining light weight and high strength in the face of extreme stresses, with extended life under extreme exterior conditions.

Some advantages of the present invention are as follows:

The height of the floating solar chimney can be increased up to some optimal height that is dictated by the materials, technology and cost.

The construction cost of the floating solar chimney is considerably lower than the cost of a conventional reinforced concrete chimney.

The cross-section of the floating solar chimney can easily be altered with the height for the optimal operation of the solar chimney.

The area of the collaborating solar collector is decreased proportionally to the increase of height for the same nominal power output of the solar power station, and consequently the construction cost of the solar collector is decreased proportionally.

An optimal combination of the height of the floating solar chimney and the area of the solar collector can be chosen for the achievement of the optimal technical and economical results.

Seismic activity of the region does not influence the construction.

In this manner, the present invention may enable the electrical power solar stations with floating solar chimneys to be economically competitive to other electrical power stations per kWh of produced energy.

BRIEF DESCRIPTION OF THE DRAWINGS

FIG. 1a shows an example embodiment of a floating solar chimney according to the present invention, in vertical position.

FIG. 1b shows the floating solar chimney in a decline position.

DETAILED DESCRIPTION

The floating solar chimney according to the present invention is based (anchored) on the seat (1.4) as shown in FIG. 1a:

The Main Chimney (1.1) has a double wall filled with lighter-than-air inflammable gas that creates the necessary buoyancy. This lifting force dictates the main chimney to take, without exterior winds, a vertical position.

The Heavy Mobile Base (1.2), also called the Heavy Base, by which the main chimney is suspended, has a total weight that is greater than the force represented by the total buoyancy of the main chimney. This dictates, in the absence of exterior winds, the heavy mobile base to sit on the seat (1.4) of the chimney.

The folding lower part of the chimney (1.3) is inside the upper part of the seat (1.4) in the absence of exterior winds.

If exterior winds appear, the main chimney (1.1) declines to a balance angle. The heavy base (1.2) supported in the edges of the seat (1.4) assumes a corresponding declined position, and the folding part of the chimney (1.3) that is fixed in the lower part of the heavy base is lifted off and accommodates this decline, ensuring the continuity of the chimney, as it appears in FIG. 1b.

Figure 2:
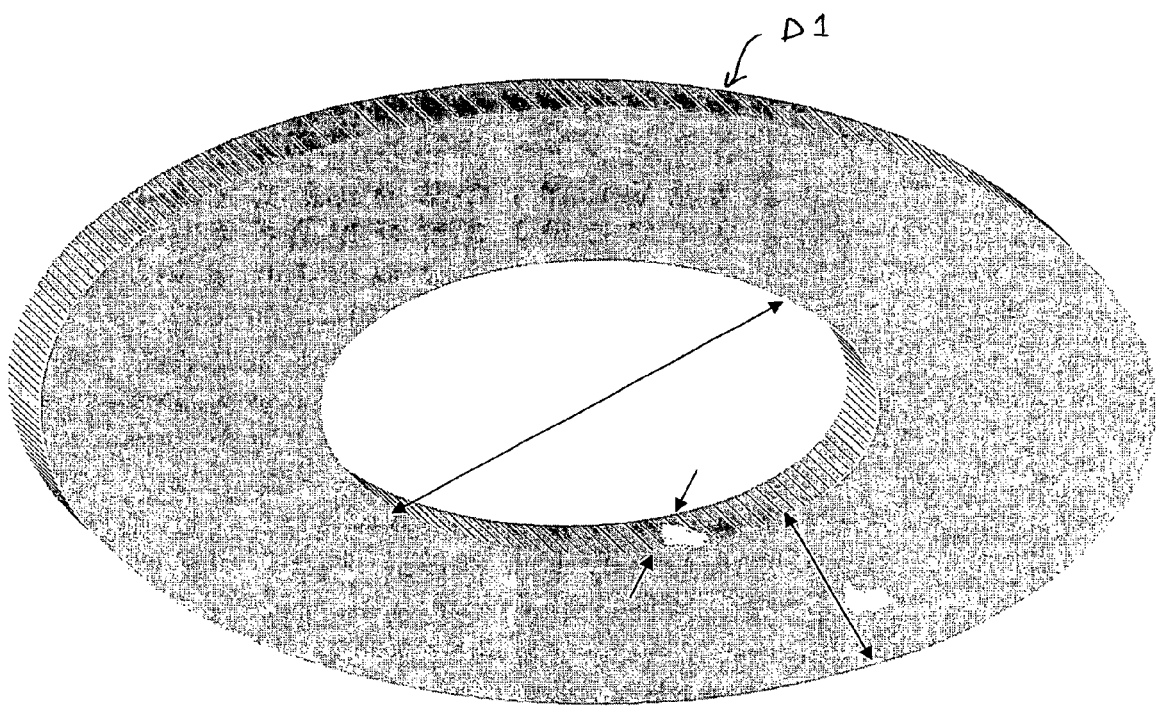
FIG. 2 shows an example embodiment of a balloon ring D1 incorporated in the floating solar chimney according to the present invention.
Figure 3:
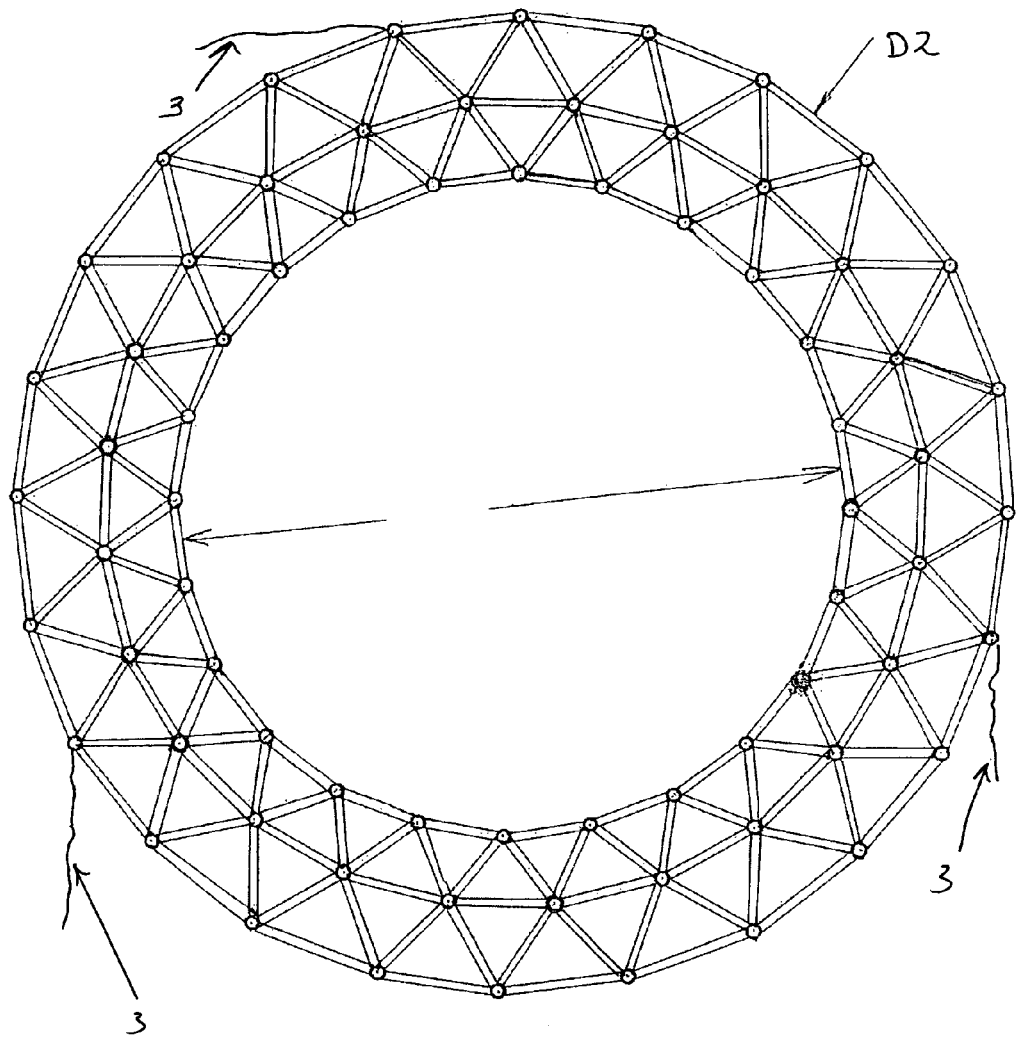
FIG. 3 shows an example embodiment of a supporting ring D2 incorporated in the floating solar chimney according to the present invention.

An example of constructing a floating chimney is presented in the following paragraphs. The example construction implements the main solar chimney with horizontal balloon cylindrical rings (Ring D1, FIG. 2) from flexible wrapping of balloons or airships (with an average surface density of 0.068 kg/sqm). Each cylindrical balloon ring D1 is filled with gas He (that gives a lifting force under regular conditions 10.36 Nt/m) or other light non-flammable gas (e.g., NH3 with lift force under regular conditions 4.97 Nt/m). The ring has an orthogonal cross-section and filling valves. The dimensions of orthogonal cross-section of ring D1 depend mainly on the diameter of solar chimney. As shown in FIG. 1a, each cylindrical ring D1 will be separated from next by a durable supporting ring D2 (which is shown in detail in FIG. 3). Rings D2 may be manufactured by pipes of hard plastic or composite materials or aluminum with suitable diameter and thickness. Hence the ring D2 supports balloon ring D1 from compressive forces of deformity. The total weight of ring D2 has to be smaller than the lift force of the balloon ring D1. Thus each balloon ring D1 will be able to rise up to any atmospheric height as part of the floating solar chimney, lifting together at least one support ring D2. The exterior part of each ring D2 will have suitable tips for the fastening to other rings D2 with the help of threads 3 (shown in FIG. 3) of high strength, in order that intermediary balloon rings to be under pressure.

The present floating solar chimney includes a set of independent successive parts which are each constituted by a fixed number of balloon rings D1 and supporting rings D2. Each part is a compact durable set that can float due to its buoyancy. Each part of the chimney is suspended by at least three threads of high strength by the upper part of the Heavy Mobile Base (1.2), as shown in FIG. 1a.

Thus each part can accommodate any declined position imposed by exterior winds without problem. The successive parts of the floating chimney are separated by a separating balloon ring D1 filled with air from the environment, which separating balloon ring has a simple aperture or a special valve that allows air to enter and exit depending on the relative movement of successive independent parts of chimney by variable exterior winds. With these intermediate, separating air rings, each part of the floating solar chimney becomes dynamically independent from the rest. The main floating solar chimney (1.1) is constituted by these successive and dynamically independent parts (sequence of D1 and D2 shown in FIG. 1a) fastened independently to the Heavy Base. The main floating solar chimney, and every component part of it, can float and stand the forces from the Bernoulli pressures caused by the internal updraft of warm air and the exterior winds. The thickness of balloon ring D1 is sufficient for the satisfactory heat insulation of the internal warm current of air, which circulates through the solar chimney, from the exterior air that has a lower temperature.

The main floating solar chimney (1.1) is coupled to the Heavy Mobile Base (1.2). The Heavy Mobile Base (1.2) is constituted by two rings (A and B shown in FIGS. 1a and 1b) of equal weight that are connected with exceptionally durable threads with high strength and high modulus, which threads are provided with flexible durable plastic films, so that the Heavy Mobile Base can accommodate any decline position while remaining attached to the top of the seat of chimney. The total weight of the Heavy Base (1.2) exceeds the overall lift force of the main chimney, and the Heavy Base forms a single set with the main chimney. Under regular conditions the upper ring A of the Heavy Base, which is manufactured with bigger diameter than the diameter of the upper part of the seat (1.4), sits on the seat of the chimney (1.4), while the lower ring B, which has smaller diameter than the internal diameter of upper part of the seat (1.4), remains inside the seat (1.4) of chimney. From the lower part of the internal ring of the Heavy Base (1.2), the folding part (1.3) of the floating solar chimney is suspended. This folding part (1.3), which has an accordion configuration, is constructed in a similar way as the main chimney, with the difference that the balloon rings D1 that constitute the folding part (1.3) have a simple aperture (or a special valve) which allows the air of the environment to enter and exit depending on the decline of main solar chimney. The height of the folding part (1.3) is selected so that it can receive the maximum decline of the main solar chimney.

The threads of high strength and modulus, combined with the intermediate supporting rings D2, ensure the strength of this folding part (1.3) against the applied forces and prevent the deformity of its cross-section when it is declined and unfolded. This allows the smooth operation of the floating solar chimney when exterior winds appear that compel the solar chimney to assume a decline angle of balance.

If a floating solar chimney is free, i.e., without the presence of exterior winds, it will have a vertical position, dictated by the net lift force of main chimney's balloon rings D1, (FIG. 1a). The exterior winds compel the floating solar chimney to assume a decline, which the heavy base and the folding part assumes, as shown in FIG. 1b. The angle of decline will be the one for which the normal drag force, from the vertical on the chimney component of the wind velocity, is equal to the counterbalancing component of net lift force of floating solar chimney.

In this case the dynamic field of flow of exterior winds facilitates the emission of hot air through the top of the solar chimney, and consequently facilitates the updraft movement of warm air inside the main chimney.

This action compensates for the reduction of active height of the floating solar chimney due to the decline that occurs when exterior winds appear. Thus the power output by floating solar chimney can be practically independent of exterior winds.

The appropriate place of installment of the solar power station should be chosen such that the expected local winds do not exceed a threshold strength for safety reasons. The threads of high strength which facilitate the fastening of the rings D2 and the final fastening to the Heavy Base (1.2) ensure the safe withholding of the floating solar chimney under the most unfavorable conditions of exterior winds.

The invention claimed is:

1. An adjustable free-standing, floating solar chimney, comprising:

a main chimney unit configured to be substantially tiltable with respect to the vertical axis, the main chimney unit including a plurality of dynamically independent floating parts, wherein each dynamically independent floating part includes at least one cylindrical balloon ring containing non-flammable, lighter-than-air gas, and wherein each dynamically independent floating part further includes at least one supporting ring to withstand compressive forces, and wherein the at least one cylindrical balloon ring and the at least one supporting ring of each dynamically independent floating part are fixedly interconnected, and wherein each dynamically independent floating part is separated from the adjacent dynamically independent floating part by an intervening balloon ring configured to freely draw in and emit air, whereby each dynamically independent floating part is enabled to move independently of adjacent dynamically independent floating parts to achieve an incline angle with respect to the vertical axis independent of incline angles of adjacent floating parts;

a base unit coupled to the main chimney unit, wherein each dynamically independent floating part of the main chimney unit is independently, fixedly connected to the base unit, and wherein the base unit includes an upper ring and a lower ring having equal weight and different exterior diameters, and wherein the upper ring and the lower ring are fixedly tied, and wherein the total weight of the base unit is larger than the net lift force provided by the lighter-than-air gas of the main chimney unit;

a dynamically variable folding unit coupled to the base unit, wherein the dynamically variable folding unit is fastened to the lower ring of the base unit and has a flexible, accordion-like configuration, and wherein the dynamically variable folding unit includes a plurality of balloon rings and a plurality of supporting rings, and wherein the plurality of balloon rings of the dynamically variable folding unit each have one of an aperture and a valve configured to freely draw in and emit ambient air, whereby the dynamically variable folding unit is configured to bend in accordance with the orientation of the main chimney unit and the base unit; and a chimney seat configured to accommodate the base unit and the dynamically variable folding unit, wherein at least a portion of the base unit is seated on the top portion of the chimney seat, and wherein at least a portion of the dynamically variable folding unit is contained within the chimney seat, and wherein an exterior diameter of the upper ring is larger than an exterior diameter of the chimney seat, and an exterior diameter of the lower ring is smaller than an internal diameter of the chimney seat.

2. The adjustable floating solar chimney according to claim 1, wherein the main chimney unit includes a double-wall configuration, and wherein the lighter-than-air gas is at least one of He and $NH_3$.

3. The adjustable floating solar chimney according to claim 1, wherein the at least one cylindrical balloon ring containing non-flammable, lighter-than-air gas is made of strengthened plastic.

4. The adjustable floating solar chimney according to claim 1, wherein the at least one supporting ring is an articulated structure including a plurality of segments made of one of: a) hard plastic; b) composite material; and c) aluminum.

5. The adjustable floating solar chimney according to claim 1, wherein the at least one cylindrical balloon ring is tied to connecting tips of the at least one supporting ring of each dynamically independent floating part, using high strength threads.

6. The adjustable floating solar chimney according to claim 1, wherein each dynamically independent floating part includes a selected number of cylindrical balloon rings and supporting rings, and wherein each dynamically independent floating part is fastened independently to the base unit, using at least three threads of high strength and high modulus.

7. The adjustable floating solar chimney according to claim 1, wherein the upper ring and the lower ring of the base unit are tied with a plurality of threads having high strength and high modulus, the plurality of threads being surrounded by a flexible plastic film of high strength, whereby air in the solar chimney is prevented from escaping between the upper ring and the lower ring of the base unit.

* * * * *